US006298194B1

United States Patent
Takahashi

(10) Patent No.: US 6,298,194 B1
(45) Date of Patent: *Oct. 2, 2001

(54) VIDEO SIGNAL REPRODUCING APPARATUS CONNECTABLE WITH PRINTER

(75) Inventor: Koji Takahashi, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,911

(22) Filed: Nov. 12, 1996

Related U.S. Application Data

(62) Division of application No. 08/674,219, filed on Jul. 1, 1996, now Pat. No. 5,608,536, which is a continuation of application No. 08/561,561, filed on Nov. 22, 1995, now abandoned, which is a continuation of application No. 08/217,775, filed on Mar. 23, 1994, now abandoned, which is a continuation of application No. 08/094,375, filed on Jul. 19, 1993, now abandoned, which is a continuation of application No. 07/625,498, filed on Dec. 11, 1990, now Pat. No. 5,258,880.

(30) Foreign Application Priority Data

Dec. 15, 1989 (JP) .................................................. 1-325006

(51) Int. Cl.⁷ .................................................... H04N 5/76
(52) U.S. Cl. ................... 386/46; 386/95; 360/27
(58) Field of Search .................................... 386/1, 46, 95, 386/125–126, 45; 358/906, 909.1; 360/79, 27; H04N 5/76, 5/92, 9/79

(56) References Cited

U.S. PATENT DOCUMENTS

| | | | |
|---|---|---|---|
| 4,481,412 | * 11/1984 | Fields | 235/472 |
| 4,698,664 | * 10/1987 | Nichols et al. | 386/4 |
| 4,805,039 | * 2/1989 | Otake et al. | 386/52 |
| 4,920,423 | * 4/1990 | Shiota | 386/46 |
| 5,046,167 | * 9/1991 | Nakano et al. | 386/69 |

FOREIGN PATENT DOCUMENTS

| | | |
|---|---|---|
| 58-97049 | 6/1983 | (JP) . |
| 3-101571 | 4/1991 | (JP) . |

OTHER PUBLICATIONS

English language abstract of Japanese Laid–Open Patent Application No. 3–101571.

English language abstract of Japanese Laid–Open Patent Application No. 58–97049.

\* cited by examiner

*Primary Examiner*—Thai Tran
(74) *Attorney, Agent, or Firm*—Robin, Blecker & Daley

(57) ABSTRACT

An apparatus for recording a video signal while forming a great number of parallel tracks on a tape-shaped recording medium, and reproducing the video signal from the track, wherein for a specified picture on the recording medium, a processing code to be used in printing the picture is recorded on the recording medium in correspondence with the specified picture, whereby without recourse to an actual printing of the specified picture, it is possible that only the practice of recording the processing code for the specified picture of the tape-shaped recording medium suffices for starting a selecting operation for the next picture.

14 Claims, 7 Drawing Sheets

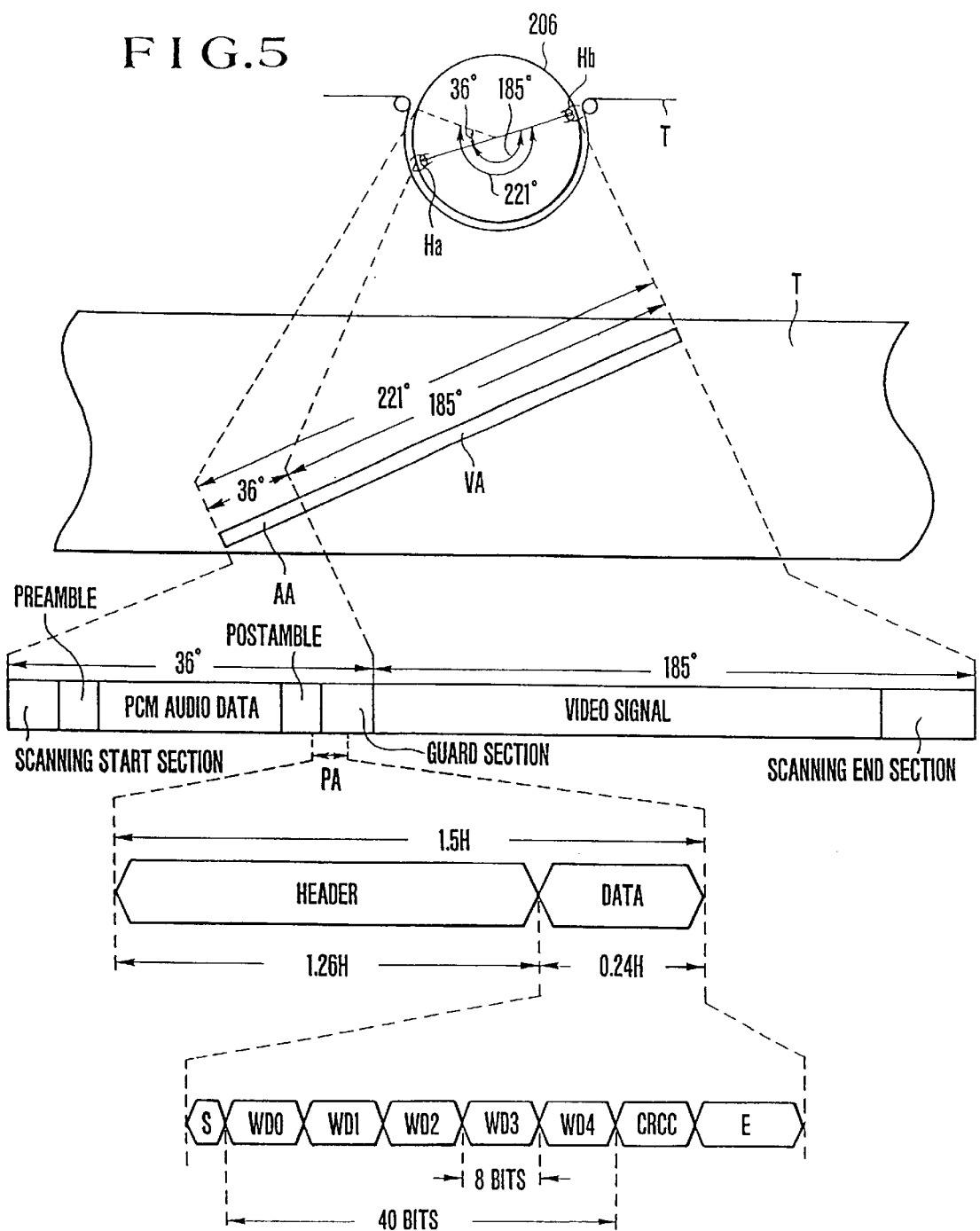

FIG.6(A)

| bit | 0 1 | 2 3 | 4 5 6 7 |
|---|---|---|---|
| CONTENTS | SORTING NUMBER | MAGNIFICATION | NUMBER OF PRINTS |

WD1~WD4 (DATA WORDS)

0 0 : FIRST GROUP   0 0 : x 1      0 0 0 0 : 0
0 1 : SECOND GROUP  0 1 : x 2      0 0 0 1 : 1
1 0 : THIRD GROUP   1 0 : x 1/4         ⌇
1 1 : FOURTH GROUP  1 1 : x 1/25   1 1 1 0 : 14
                                   1 1 1 1 : MULTIPLE

FIG.6(B)

| bit | 0 | 1 | 2 | 3 4 5 6 7 |
|---|---|---|---|---|
| CONTENTS | PARENT | PRINTING | FIELD/FRAME | FRAME NUMBER |

WD0 (CONTROL WORD)

0: NONE        0: COMPLETED   0: FIELD
1: PRESENT     1: NOT YET     1: FRAME 0 0 0 0 0 : 0
0 0 0 0 1 : 1
0 0 0 1 0 : 2
       ⌇
1 1 1 0 0 : 28
1 1 1 0 1 : 29
0 0 0 1 0 : 30

| 01 | 02 | 03 | 04 | 05 |
|---|---|---|---|---|
| 0012 | 0089 | 0214 | 0431 | 0456 |
| 06 | 07 | 08 | 09 | 10 |
| 0518 | 0623 | 0727 | 0822 | 0987 |
| 11 | 12 | 13 | 14 | 15 |
| 1234 | 1432 | 1555 | 2345 | 2468 |
| 16 | 17 | 18 | 19 | 20 |
| 3456 | 3457 | 4567 | 5678 | 5963 |
| 21 | 22 | 23 | 24 | 25 |
| 7231 | 7741 | 8123 | 8811 | 9674 |

VIDEO SIGNAL REPRODUCING APPARATUS CONNECTABLE WITH PRINTER

This application is a division of application Ser. No. 08/674,219, filed Jul. 1, 1996 (U.S. Pat. No. 5,608,536), which is a continuation of Ser. No. 08/561,561, filed Nov. 22, 1995, abandoned which is a continuation of Ser. No. 08/217,775, filed Mar. 23, 1994, abandoned, which is a continuation of Ser. No. 08/094,375, filed Jul. 19, 1993, abandoned, which is a continuation of Ser. No. 07/625,498, filed Dec. 11, 1996 (U.S. Pat. No. 5,258,880).

BACKGROUND OF THE INVENTION

1. Field of the Invention

This invention relates to video signal reproducing apparatuses and, more particularly, to a video signal reproducing apparatus suited to be connected with a printer for printing the video signal of a specified picture.

2. Description of the Related Art

In a case where a picture corresponding to the video signal reproduced by the video tape recorder (VTR) is printed by a printer, it has been typical that a desired picture is selected out of the pictures of the reproduced signals from the VTR and is stored in a memory in the printer, and the video data is read from the memory at a predetermined speed, so that the picture is printed out.

FIG. 1 schematically shows a conventional system of this kind comprising a VTR 81, a monitor 82 and a video printer 83. A desired picture out of a great number of pictures recorded on the tape is printed in the way described below.

To begin with, the VTR 81 is set to the reproduction mode, and the monitor 82 and the printer 83 are supplied with the reproduced video signals from the VTR 81. As the monitor 82 is then sweeping the pictures, the operator actuates a console of the printer 83 at the timing when the desired picture is displayed. Responsive to this actuation, a control portion 85 operates a memory portion 84 so that either one field or one frame (hereinafter simply referred to as "one picture") of video signal is stored in the memory portion 84. The video signal, after having been stored for one picture in the portion 84, is read out at a predetermined speed corresponding to the printing speed of a printing portion 86. By this, printing of the desired picture is realized with the printing portion 86.

Incidentally, in the conventional art, the video signal supplied from the VTR 81 to the printer 83 is generally an analog video signal.

In such a conventional system as has been descried above, even if a plurality of pictures to be printed are on one and the same tape, the operator has to repeat a process of the steps of choosing one picture and then waiting a relatively long time during which the printing goes on and, after that, choosing the next picture, and so on. To print a great number of pictures, therefore, the operator is occupied for a very long time at the console of the system till the end of printing of all.

Another drawback is that if one desires to get the picture that has once been used in printing for the purpose of printing it again, to select the same picture again is impossible. In more detail, since, in the VTR, the video signals are recorded as moving images at 30 frames or 60 fields a second, the tape capable of recording for 120 minutes has about 430 thousand pictures in field per cassette recorded thereon. Hence, it is virtually impossible to pick up the specified picture out of these pictures as searching is repeated again.

SUMMARY OF THE INVENTION

The present invention has a general object to solve the above-described problems.

Another object of the invention is to provide a video signal reproducing apparatus which, when printing a specified picture on a recording medium on which a great number of pictures are recorded, enables its manageability to be improved.

Under such an object, according to the invention, in an embodiment thereof, a video signal reproducing apparatus is proposed, comprising video reproducing means for reproducing, from a recording medium on which a video signal for a multiplicity of pictures is recorded, the video signal, control input means for inputting control information to be used in a printer connectable with the reproducing apparatus, and control recording means for recording the control information at recording positions on the recording medium which are determined in correspondence with respective recorded positions of the multiplicity of pictures on the recording medium.

Yet another object of the invention is to provide a video signal reproducing apparatus which is able to more speedily extract a specified picture on the recording medium on which a great number of pictures are recorded.

Other than the above-described objects of the invention and its features will become apparent from the following detailed description of embodiments of the invention by reference to the drawings.

BRIEF DESCRIPTION OF THE DRAWINGS

FIG. 5 is a plan view schematically illustrating the relationship of the phase of rotation of the heads, the recording position on the tape and the recorded data.

FIG. 6(A) and FIG. 6(B) show concrete examples of data for print control to be recorded.

DETAILED DESCRIPTION OF THE PREFERRED EMBODIMENTS

An embodiment of the invention is described below.

Figure 1:
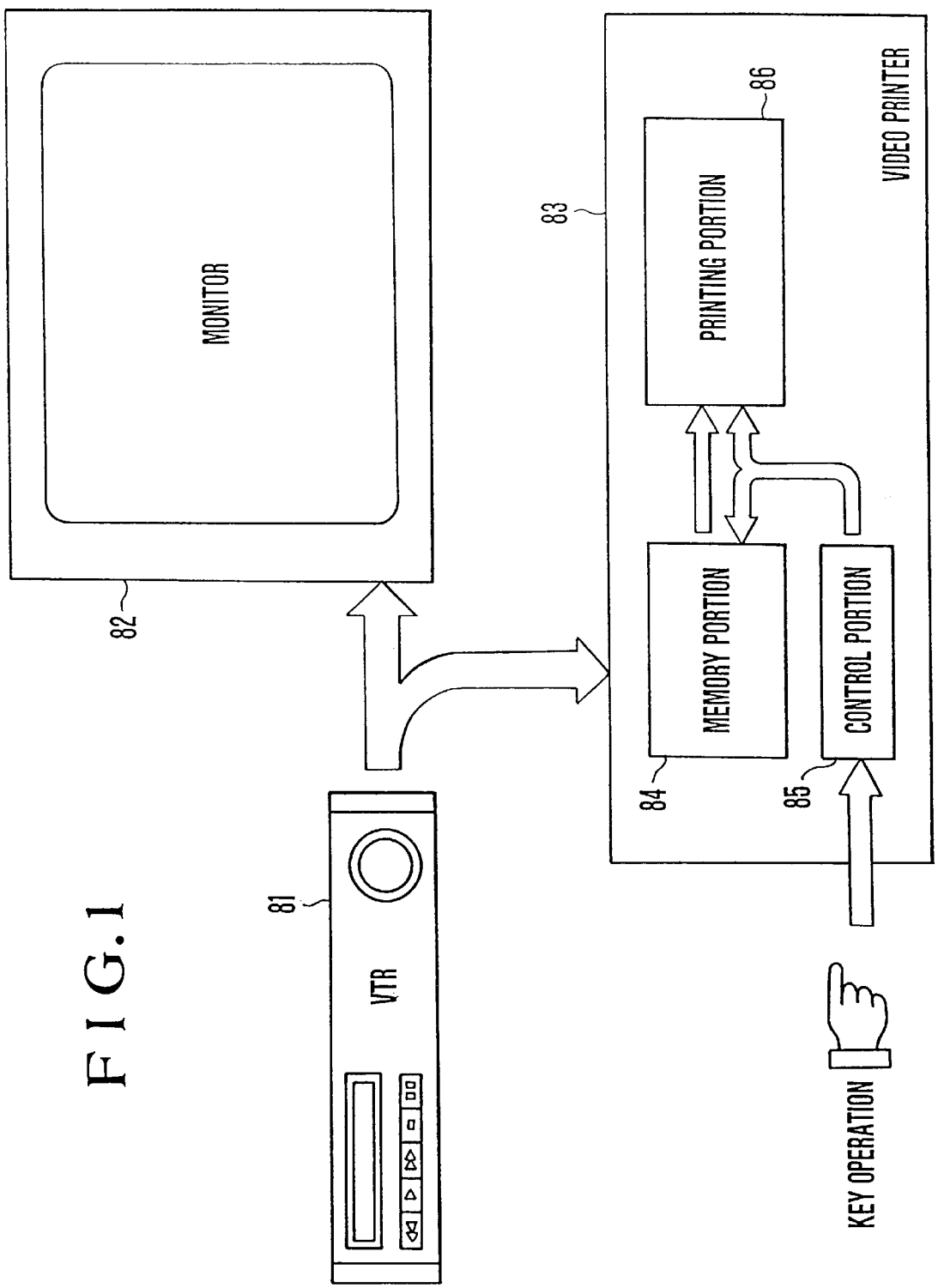
FIG. 1 is a schematic diagram of the conventional system including the VTR and the printer.
Figure 2:
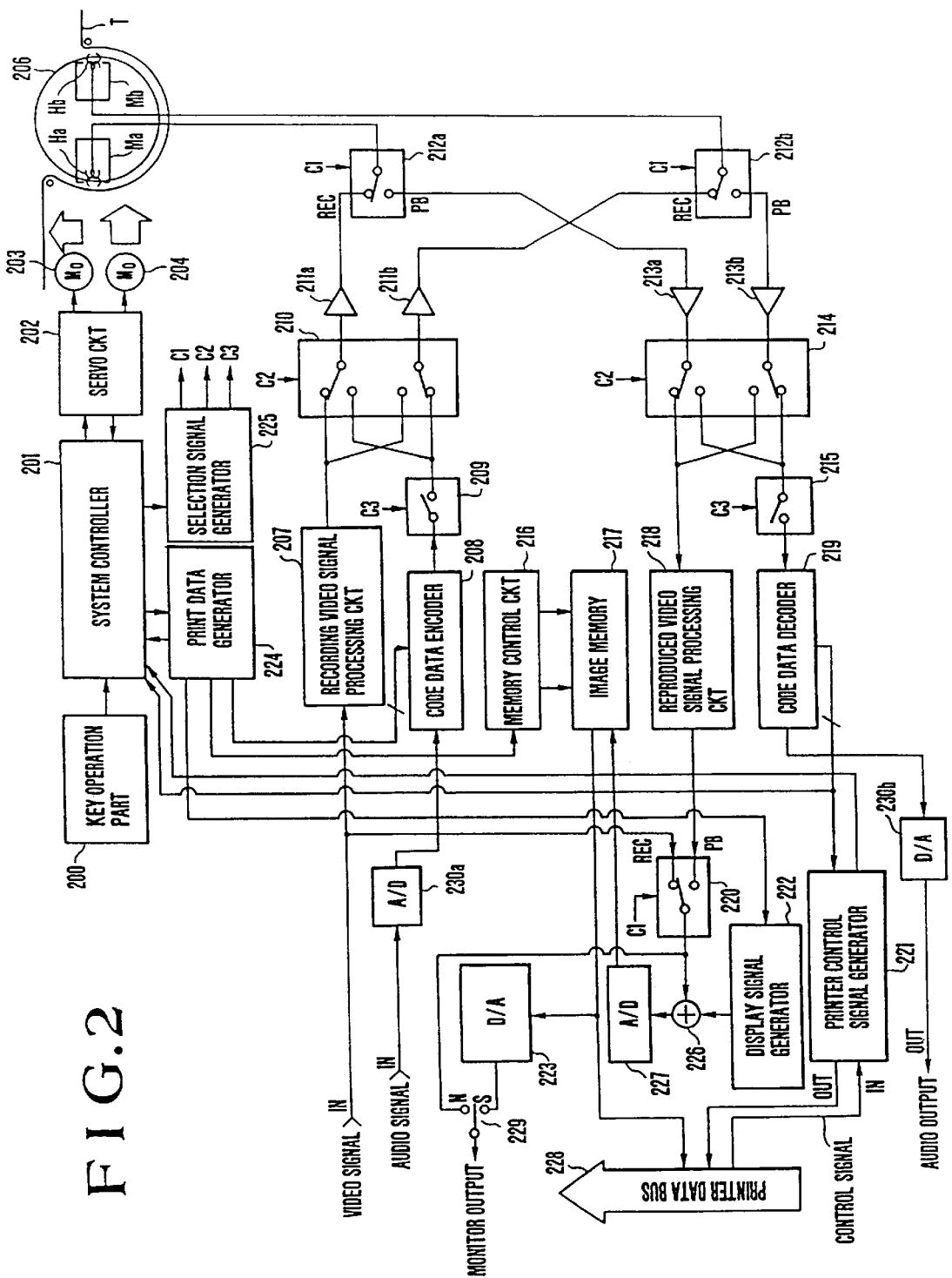
FIG. 2 is a block diagram illustrating the arrangement of the main parts of an embodiment of a VTR according to the invention.
Figure 3:
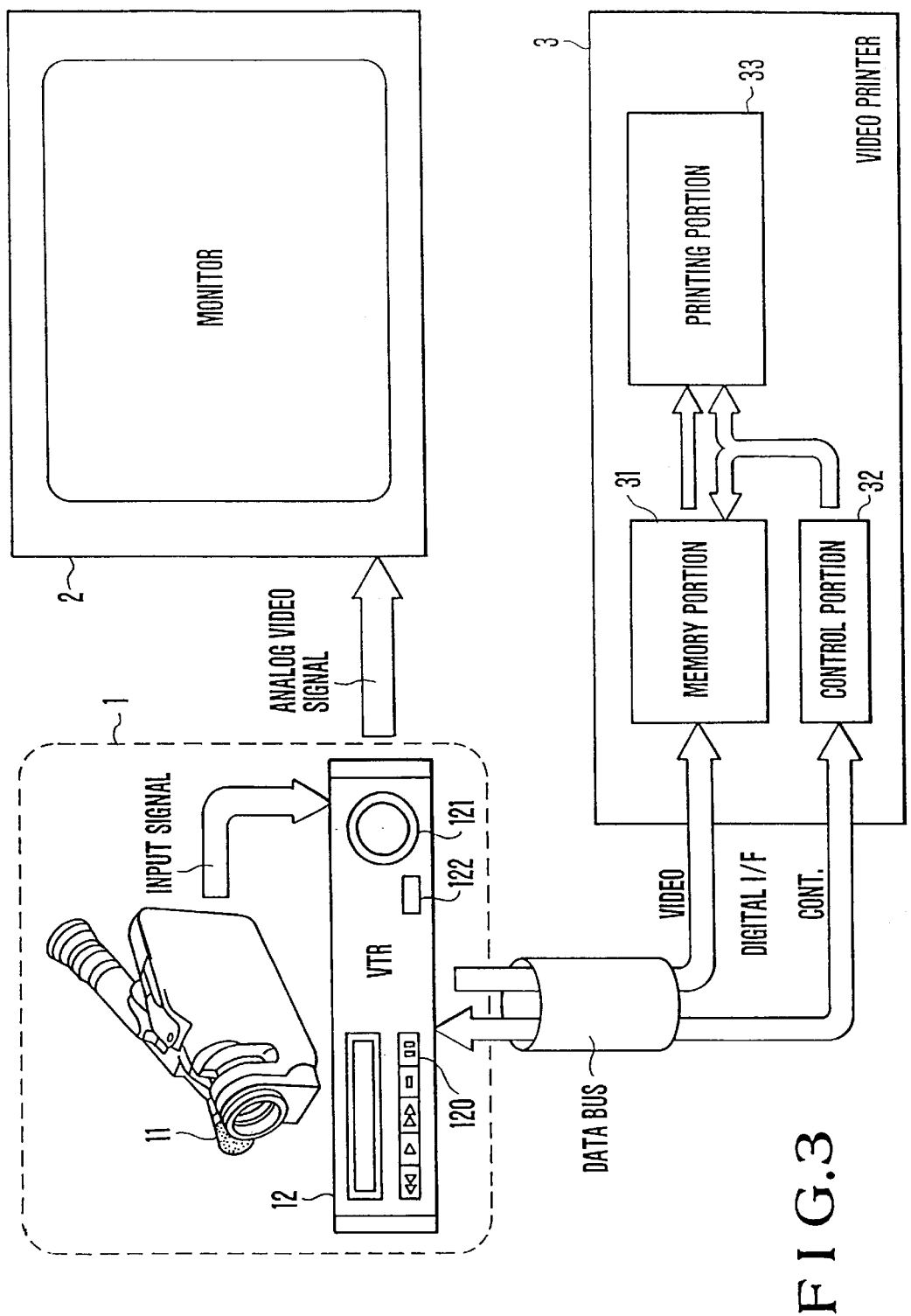
FIG. 3 is a schematic diagram of the construction of the entirety of a system including the VTR of FIG. 2.

FIG. 2 in block diagram roughly shows the construction and arrangement of the parts of the VTR embodying the invention, and FIG. 3 schematically shows the entirety of a system including the VTR of FIG. 2.

In FIG. 3, reference numeral 1 denotes a recording and reproducing apparatus portion. As the input video signal, an image sensing video signal from, for example, a video camera 11 of VTR-integrated type, or a video signal from a tuner within a stationary type VTR 12 is assumed. In this embodiment, the apparatus shown in FIG. 2 corresponds to the recorder portion of, for example, the stationary type VTR 12. Incidentally, the arrangement of FIG. 2 may be the recorder portion in the VTR-integrated type video camera 11.

The video signal reproduced by the recording and reproducing apparatus portion 1 is supplied, as an analog signal to a monitor 2. The operator, while looking at pictures presented on the monitor 2, manipulates the VTR 12. That is, when a picture desired to be printed comes near, the operator manipulates a pause (temporary stop) button 120 or a known shuttle dial 121 for freely varying the reproducing speed. The tape is transported until the desired picture is reproduced, and stopped in a state where the desired picture is displayed on the monitor 2. In the present embodiment, in this state where the desired picture is displayed on the monitor 2, a print designating button 122 is pushed to record processing data for printing on the tape.

In the following, the above-described operation is described in more detail by reference to the block diagram of FIG. 2 and the flowchart of FIG. 4.

At first, by operating a key operation part 200 of FIG. 2, the VTR 12 is set to the reproduction mode. At this time, a system controller 201 controls the various portions of the apparatus in accordance with control information from the operation part 200. For example, the system controller 201 controls a capstan motor 203 and a drum motor 204 through a servo circuit 202. It controls switches 209, 212a, 212b and 214 through a selection signal generator 225. Of course, in this reproduction mode, the reproducing speed is varied to any appropriate value by manipulating the aforesaid dial 212, pause button 210, etc. This variation is realized by varying the speed of rotation of the capstan motor 203. Further the speed of rotation of the drum motor 204 is varied so as to keep constant the speed of heads Ha and Hb relative to the tape T. Incidentally, it is assumed that the difference in gradient between the tracing locus of the head and the track is always compensated for by head moving mechanisms Ma and Mb.

In such a reproduction mode, the recording and reproducing heads Ha and Hb mounted on the drum 206 reproduce video signals, which pass through switches 212a and 212b which are in their PB positions, and amplifiers 213a and 213b, respectively, and further through a common switch 214, become a continuous signal. This signal is supplied to a reproduced video signal processing circuit 218. The video signal output from the signal processing circuit 218 is supplied through the PB side terminal of a switch 220 and the N side terminal of a switch 229 to the monitor 2. Meanwhile, the audio signal is reproduced from an audio area AA to be described later, and is output through a switch 214, a normally closed switch 215, a code data decoder 219 and a D/A converter 230.

The operator, while looking at moving images displayed on the monitor 2, searches for a desired picture by manipulating the dial 121, etc. At the timing the desired picture is displayed, the operator pushes the pause button 120, switching the VTR 12 to a still image reproduction mode. Under this condition, the operator manipulates the print designating button 122. This information is then sent from the key operation part 200 to the system controller 201. The operation up to this corresponds to a step S1 of the flowchart of FIG. 4.

Figure 4:
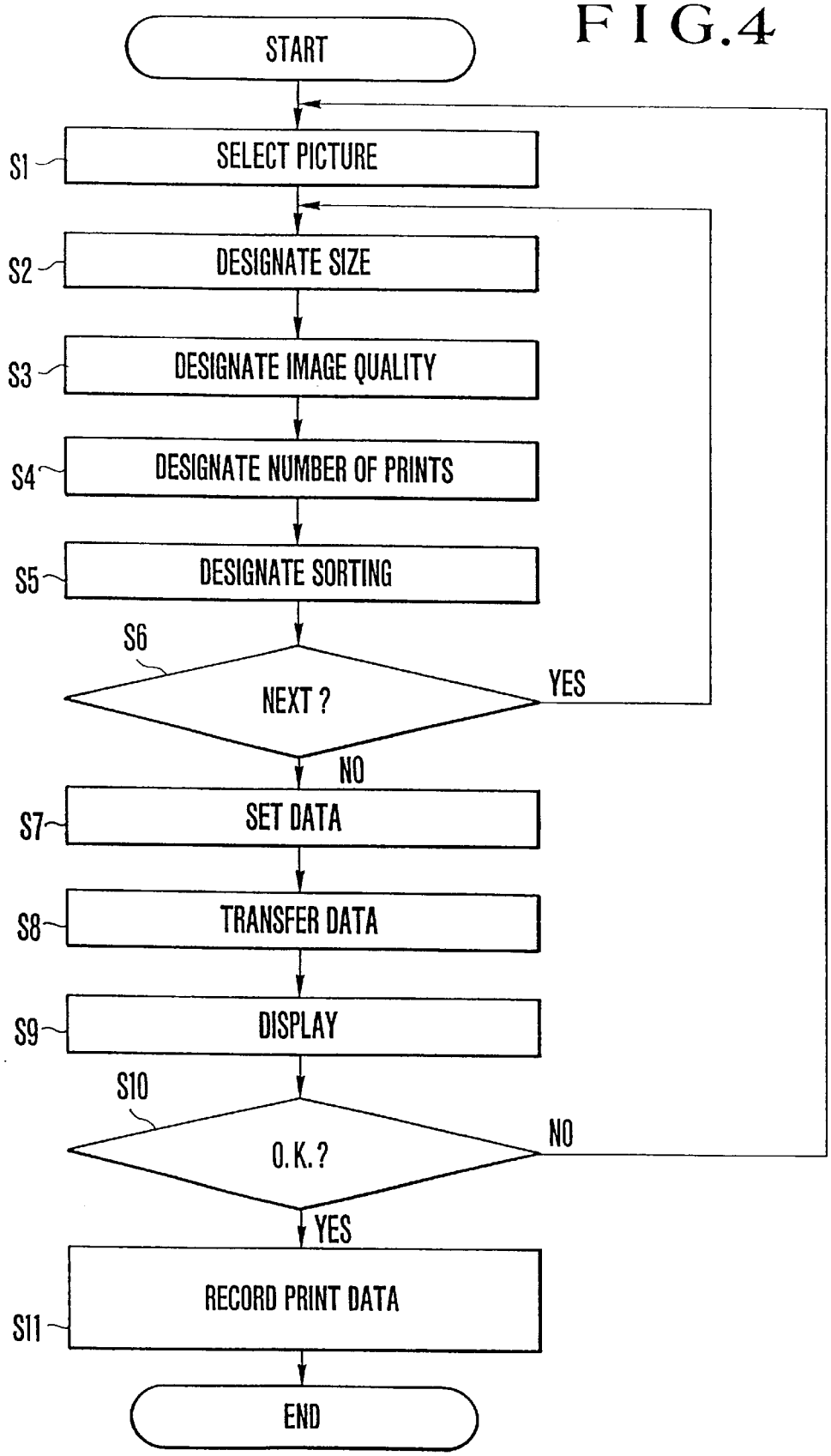
FIG. 4 is a flowchart for the operation of the VTR of FIG. 2 at the time of designating a picture to be printed.

Next, the flow advances to a step S2 of FIG. 4, where a size of the picture to be printed is designated by the operation part 200. Subsequently, by the operation part 200, the operator designates a image quality (step S3), a number of prints (step S4), sorting (step S5), etc. successively. These steps S2–S4 are set for each print size. Whether or not there is another print size is designated from the operation part 200 in a step S6. If present, the flow returns to the step S2. If absent, it advances to a step S7.

In the step S7, data produced in the above-described steps S2–S5 (hereinafter called the "print" data) is generated in a print data generator 224. In a step S8, this print data is sent to a code data encoder 208 and also to a display signal generator 222. Here, the reproduced video signal output from the switch 220 and the output signal of the display signal generator 222 corresponding to the print data are mixed by an adder 226. Characters representing the print data are superimposed on the picture to be printed. The video signal corresponding to such a picture is converted into digital form by an analog-to-digital (A/D) converter 227. The output of the A/D converter 227 is supplied to an image memory 217. At this time, the print data generator 224 commands the memory control circuit 216 to take the video signal for one frame from the A/D converter 227 into the image memory 217 and to read out this repeatedly. By this, the video signal from the image memory 217 is converted into analog form by a D/A converter 223, and is output through the S side terminal of a switch 229 to the monitor 2 (step S9).

Next, the operator, on looking at the picture displayed on the monitor 2, confirms the picture to be printed and the print data, and checks whether or not they are the same contents as desired (step S10). If not the same contents as desired, the flow returns to the step Si to allow the operator to try again from the beginning. If the contents are the same as desired, the flow advances to a step S11, where the above-described print data is recorded.

In the following, this recording of the print data is explained.

As usual, when the VTR of FIG. 2 is set in the recording mode, a recording video signal processing circuit 207 converts the input video signal into a form suited to be recorded, and its output is supplied to a switch 210. Meanwhile, the audio signal digitized by an A/D converter 230 is also coded in the code data encoder 208 and supplied through a normally closed switch 209 to a switch 210. FIG. 5 is a diagram schematically illustrating the phase of rotation of the head Ha or Hb and the tracing position on the tape T. The switch 210 connects the recording video signal processing circuit 207 to an amplifier 211a or 211b during a period when the head Ha or Hb traces the video area VA, or connects the code data encoder 208 to the amplifier 211a or 211b during a period when the head Ha or Hb traces the audio area AA.

Now, when the recording of the print data is carried out by a step S11 of FIG. 4, the switch 209 is controlled by a signal $C_3$ output from the selection signal generator 225 so that the switch 209 turns on for only the period when the head Ha or Hb traces the print data area PA corresponding to parts of a postamble portion and a guard section of the audio area AA. Also, by a signal $C_1$, for this period only, the switches 212a and 212b are connected to the REC side. By this, the print data encoded by the code data encoder 208 can be recorded in the print data area PA on the tape T. That is, if, in the before-described step S10, the print picture and the print data have the same contents as desired, the print data is recorded in the print data area PA of that track in which the video signal being reproduced has been recorded, in the step S11.

Here, the recording format for the print data is explained by using FIG. 5 and FIGS. 6(A) and 6(B). As shown in FIG. 5, the above-described print data area PA corresponds to 1.5 horizontal scanning periods of the video signal. That is, the before-described switch 209 is turned on for only the period corresponding to this 1.5 H. This area of 1.5 H is divided into a header portion of 1.26 H and a data portion of 0.24 H. A head search signal to be described later is recorded in the header portion, and the print data is recorded in the data portion. In the data portion, as shown in FIG. 5, five words WD0–WD4, start identification data S, end identification data E and a CRCC for error correction are recorded. Each of the words WD0–WD4 consists of 8 bits, and the contents of the words are shown in FIG. 6(A) and FIG. 6(B).

As shown in FIG. 6(A), each of the four data words WD1–WD4 has 2 bits assigned to sorting number, 2 bits to the magnification (print size), and 4 bits to the number of prints. As the sorting number, 4 different values (4 groups) can be set. For each of these, a different value of magnification can be set. An example of this scheme is shown in FIG. 6(A). The number of prints, because of the use of 4 bits, can be set in a range of 0 to 14, except for these 4 bits all taking "1". This case has a special meaning, say, a multi-picture print. This means that the picture being reproduced and 25 pictures that follow are printed as one sheet of picture. In analogy to the conventional silver-halide photography, this print mode is used in expecting an equivalent result to the contact printing of all the frames of common negative roll film in a sheet.

The word WD0 is for control of the words WD1–WD4 and includes one bit (the second bit) representing whether one field of data or one frame of data is used to make a print picture, another bit (the first bit) representing whether or not the printing has been completed. The zeroth bit represents whether or not a time space of 10 seconds just before this picture to be printed has a print-designated picture (hereinafter simply called the "parent" picture). Its setting will be described later. The third to the seventh bits are data of five bits representing that this print picture corresponds to what frame number defined by the time code or the like.

Now, returning again to the step S11 of the flowchart of FIG. 4, the print data shown in FIG. 6(A) and FIG. 6(B) is recorded in the print data recording area PA of that track in which the print-designated picture has been recorded. After this, the system controller 201 drives the capstan motor 203 to rotate at the same speed as in the normal recording mode, and the head search signal is recorded in the aforesaid header portion for 10 seconds. For example, a carrier signal of 2.9 MHz is usually recorded in the header portion, and a carrier signal of 5.8 MHz is recorded in the portion corresponding to the aforesaid time space of 10 seconds. And, the zeroth bit of the before-described word WD0, i.e., one bit which represents the presence or absence of a parent picture, if, as the head search signal is reproduced in the step S10, this has 5.8 MHz, is automatically set to "1".

From the tape having the print-designated picture set in such a way, the print-designated picture is then printed. This operation is described below.

The operator first loads the tape having the print-designated picture set therein to the VTR 12 and manipulates the operation part 200 to produce a print command. Responsive to this, the system controller 201 drives the capstan motor 203 and the drum motor 204 through the servo circuit 202. So, the tape T is transported at a high speed, while the signal from the before-described print data area PA is simultaneously reproduced. During this time, the switches 212a and 212b are connected to the PB side terminals, and the switch 214 connects the amplifiers 213a and 213b to the side of the code data decoder 219. The switch 215 is turned on at the timing when the head Ha or Hb traces the print data area PA. The code data decoder 219, when the reproduced signal from the before-described header portion is 5.8 MHz, produces an output of "1" as the head search control signal. Responsive to this change of the head search control signal to "1", the system controller 201 controls the capstan motor 203 so as to transport the tape in the direction reverse to that in the recording mode at the same speed as in the recording mode.

In this state, the code data decoder 219 decodes data reproduced from the data portion. Of the data shown in FIGS. 6(A) and 6(B), if the 4-bit data representing the number of prints is other than "0000", the system controller 201 stops transporting of the tape T. Incidentally, at this time, either of a mode in which the transporting of the tape T is stopped only when the data indicating that the picture is not yet printed is being detected and another mode in which the transporting of the tape T is stopped regardless of whether the picture is already printed or not yet printed can be set. After this stop of the tape T, printing of the reproduced picture is carried out as follows.

With the tape T in the stopping state, the heads Ha and Hb on the head moving mechanisms Ma and Mb trace the respective recorded tracks of the designated picture. The thus-reproduced video signals are supplied through the reproduced video signal processing circuit 218, the adder and the A/D converter 227 to, and stored in, the image memory 217. Further, the print data is supplied through the code data decoder 219 to, and stored in, the printer control signal generator 221 that functions as an interface. When these storing operations end, the data stored in the image memory 217 and the printer control data output from the printer control signal generator 221 are transferred to a printer data bus 228. According to the control data, the printer 3 prints the video data transferred from the data bus 228. When the printing is completed, the printer 3 sends data representing the end of printing to the data bus 228. And, the printing end data output from the printer 3 is sent through the printer control signal generator 221 to the system controller 201. The VTR 12 then performs the next operation.

That is, the VTR 12, when supplied with the printing end data, if the first bit of the word WD0 is "1", performs rewriting of the print data to "0". The operation at this time of the VTR 12 is similar to that when the print data is recorded. So, no more explanation is given. And, the next designated picture is then searched. If a parent picture is present, the VTR 12 starts from the step of transporting the tape in the reverse direction at the same speed as in the recording mode. If not present, it starts from the step of transporting the tape in the normal direction at a high speed.

Figures 7, 8:
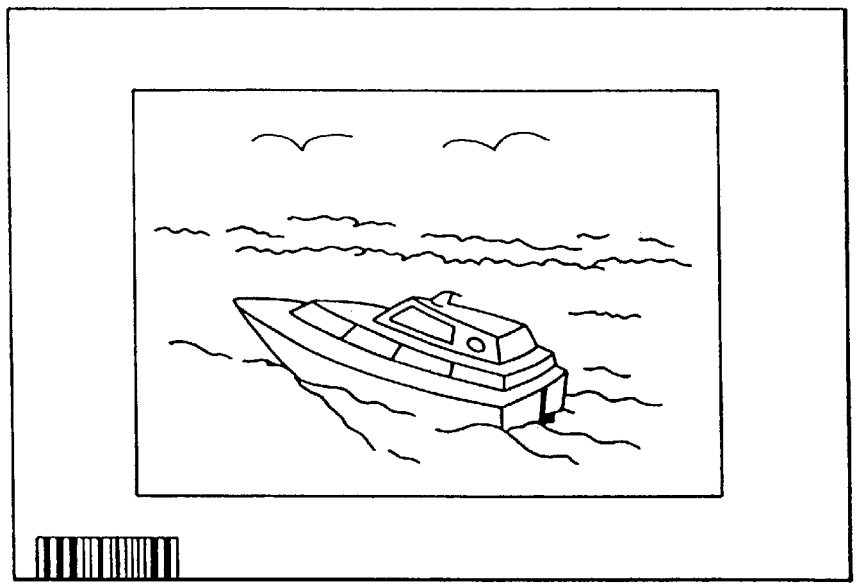
FIG. 7 and FIG. 8 show an example of application of the print output by the system of FIG. 3.

Lastly, applied examples of prints obtained from the system of the above-described embodiment are shown in FIG. 7 and FIG. 8. FIG. 7 exemplifies unity magnification of print. In the left lower corner of the print, the previously described print data of the words WD0–WD4 are recorded by a bar code. If the printer 3 is made to have a function of recording and reproducing this code, it becomes possible to search the original video signal on the tape T from this print. FIG. 8 shows a multi-picture printed out when the print number data of the words WD1–WD4 are all "1". In the right lower corner of each contracted picture, a picture address on the tape in the form of a time code or the like is imprinted. If the VTR 12 is provided with a function of searching the tape T by using this time code, it becomes possible to search the original video signal on the tape T either.

In the system including the VTR of such construction as described above, it is first made possible that after all pictures to be printed have been chosen, each picture is automatically printed. Therefore, the manageability of this kind of system is remarkably improved.

Another advantage is that even the picture once used to print can be duplicated easily by reproducing the print data on the tape.

Further, by adding a mark for head search to each of a predetermined number of pictures in the neighborhood of a print-designated picture, the tape can be transported at a high speed when searching for the print-designated picture.

As has been described above, according to the video signal reproducing apparatus of the invention, when printing a desired picture recorded on a tape-shaped recording medium, an improvement of the manageability and an increase of the accuracy of picture search can be realized.

What is claimed is:

1. An image printing apparatus, comprising:

input means for inputting an image signal and printing control information reproduced from a recording medium, said printing control information including at least information for designating an image to be printed;

printing means for printing an image corresponding to said image signal inputted by said input means; and control means for causing said printing means to print an image indicative of said printing control information together with said image to be printed, said control means comprising conversion means for converting the printing control information into an image signal for printing.

2. An apparatus according to claim 1, wherein said printing control information converted by said conversion means includes information of position of said printed image on the recording medium.

3. An apparatus according to claim 2, wherein said image indicative of said printing control information is printed as a bar-code together with the image signal.

4. An apparatus according to claim 1, wherein said printing control information includes information indicative of a printing size of the image.

5. An apparatus according to claim 1, wherein said printing control information includes information indicative of a printed image quality.

6. An apparatus according to claim 1, wherein said printing control information includes information indicative of a printing sheet number.

7. An apparatus according to claim 1, further comprising printing control information input means for inputting the information from outside.

8. An image printing method, comprising:

inputting an image signal and search information for searching said image signal reproduced from a recording medium;

printing an image corresponding to said inputted image signal; and controlling said printing step to cause printing of the inputted search information for searching said image signal to be printed from said recording medium together with the image, said controlling including converting the inputted search information into an image signal for printing.

9. A method according to claim 8, wherein said search information converted by said controlling includes information of position of said printed image on the recording medium.

10. A method according to claim 9, wherein said image indicative of said search information is printed as a bar code together with the image signal.

11. method according to claim 8, wherein said search information includes information indicative of a printing size of the image.

12. A method according to claim 8, wherein said search information includes information indicative of a printed image quality.

13. A method according to claim 8, wherein the search information includes information indicative of a printing sheet number.

14. A method according to claim 8, further comprising search information input means for inputting the information from outside.

* * * * *

UNITED STATES PATENT AND TRADEMARK OFFICE
CERTIFICATE OF CORRECTION

PATENT NO.   : 6,298,194 B1
DATED        : October 2, 2001
INVENTOR(S)  : Koji Takahashi It is certified that error appears in the above-identified patent and that said Letters Patent is hereby corrected as shown below:

<u>Column 4,</u>
Line 29, delete "Si" and insert -- S1--.

<u>Column 6,</u>
Line 65, delete "tape T either." and insert -- tape T. --.

Signed and Sealed this

Twenty-sixth Day of November, 2002

*Attest:*

JAMES E. ROGAN
*Attesting Officer*        *Director of the United States Patent and Trademark Office*